US011868058B2

(12) United States Patent
Donaldson et al.

(10) Patent No.: US 11,868,058 B2
(45) Date of Patent: Jan. 9, 2024

(54) LEAD EDGE OFFSET CORRECTION FOR INTERMEDIATE TRANSFER DRUM IMAGING

(71) Applicant: Xerox Corporation, Norwalk, CT (US)

(72) Inventors: Patricia J. Donaldson, Pittsford, NY (US); Jack T. Lestrange, Macedon, NY (US)

(73) Assignee: Xerox Corporation, Norwalk, CT (US)

(*) Notice: Subject to any disclaimer, the term of this patent is extended or adjusted under 35 U.S.C. 154(b) by 103 days.

(21) Appl. No.: 17/490,450

(22) Filed: Sep. 30, 2021

(65) Prior Publication Data

US 2023/0288832 A1 Sep. 14, 2023

(51) Int. Cl.
*G03G 15/01* (2006.01)
*G03G 15/00* (2006.01)
*B41J 2/005* (2006.01)

(52) U.S. Cl.
CPC ..... *G03G 15/0194* (2013.01); *G03G 15/0131* (2013.01); *G03G 15/5058* (2013.01); *B41J 2/0057* (2013.01); *G03G 2215/0158* (2013.01)

(58) Field of Classification Search
CPC .... B41J 13/0009; B41J 29/38; B41J 2/04536; B41J 2/0057; B41J 2002/012; B41J 11/42; G03G 15/0194; G03G 15/0131; G03G 15/5058; G03G 2215/0158
See application file for complete search history.

(56) References Cited

U.S. PATENT DOCUMENTS

| | | | |
|---|---|---|---|
| 8,162,428 | B2 | 4/2012 | Eun et al. |
| 8,251,504 | B2 | 8/2012 | Viturro et al. |
| 8,303,071 | B2 | 11/2012 | Eun |
| 8,328,315 | B2 | 12/2012 | Eun et al. |
| 8,346,503 | B2 | 1/2013 | Eun et al. |
| 8,491,081 | B2 | 7/2013 | Leighton et al. |
| 8,567,894 | B2 | 10/2013 | Viturro et al. |
| 8,814,300 | B2 | 8/2014 | Shin et al. |
| 8,833,927 | B2 | 9/2014 | Leighton et al. |
| 8,870,331 | B2 | 10/2014 | Mo et al. |
| 8,888,225 | B2 | 11/2014 | Donaldson et al. |
| 8,967,789 | B2 | 3/2015 | Mandel et al. |
| 9,022,500 | B2 | 5/2015 | Leighton et al. |
| 9,046,848 | B2 | 6/2015 | Tomishina |
| 9,278,531 | B1 | 3/2016 | LeFevre et al. |

(Continued)

*Primary Examiner* — Thinh H Nguyen
(74) *Attorney, Agent, or Firm* — Caesar Rivise, PC

(57) ABSTRACT

An apparatus and method for compensating for variation of the image placement for each color station in an intermediate transfer drum system. A sensor detects the image placed by the previous station and triggers the imaging on the drum such that it properly registered to the previous image. However, the variation of the drum's radius results in runout which creates an error in the image placement, since the surface drum travel will be larger or smaller than expected. The method to correct for a lead edge offset for radial runout involves dividing the drum into regions and calculating an offset center of each region. As the drum transitions from region to region the offset value is updated to determine when to start imaging for proper placement on the sheet. The offset can be derived from the image runout to find the distance traveled from the transfer point or can be measured directly from color-to-color registration variation.

14 Claims, 11 Drawing Sheets

(56) References Cited

U.S. PATENT DOCUMENTS

| | | | | |
|---|---|---|---|---|
| 9,409,389 | B1 | 8/2016 | Donaldson et al. | |
| 9,844,961 | B1 | 12/2017 | Mantell et al. | |
| 10,635,954 | B2 | 4/2020 | Donaldson et al. | |
| 10,717,305 | B2 | 7/2020 | Donaldson | |
| 2010/0123752 | A1* | 5/2010 | Eun | B41J 15/165<br>347/19 |

* cited by examiner

LEAD EDGE OFFSET CORRECTION FOR INTERMEDIATE TRANSFER DRUM IMAGING

FIELD OF DISCLOSURE

This invention relates generally to printing devices, and more particularly, to the coordination of the print head/substrate position with regard to registering/transferring another image from the print head to the substrate that contains an existing image.

BACKGROUND

In a system with an intermediate transfer drum for each station, a sensor prior to the drum is used to detect the location of a previously printed image of a different color, so that the image for this station can be accurately registered to the previous image. The transfer drum itself has minimal runout, however it is coated with a "blanket" of variable thickness which has the appropriate properties to both accept the image and transfer it to paper. In the case shown in FIGS. 1A-1B, the image is printed directly onto the blanket, and the image point is 180 degrees from the transfer point. There may be multiple other stations around the drum, to prepare the drum to accept the image, to deposit ink on the imaged pixels and to clean the drum, but they don't impact the lead edge offset.

In FIGS. 1A-1B, the thickness variation in the blanket has been magnified to make the problem obvious. The page sync sensor in this case is located a distance πr0 from the image point, so that imaging starts as soon as the sensor triggers. r0 is the nominal distance from the drum axis of rotation to the blanket surface. In case 1 (FIG. 1A), the actual radius of the drum between the image point and the transfer point is much less than r0, If the image is printed as the sensor triggers, the actual distance traveled by paper before the image contacts the paper is less than πr0, and the image will be printed too soon.

In case 2 (FIG. 1B), the thicker side of the blanket is facing the sensor when the sensor triggers on an incoming image, and the distance traveled by the drum/paper before the image contacts the paper will be too large, giving misregistration in the opposite direction.

For example, U.S. Pat. No. 10,717,305 (Donaldson) uses the measured time (for example, a number of 100 MHz clock counts) between encoder tics to measure runout and generate runout correction tables/functions to accurately calculate the positions of the media transport as a function of an angular position of the encoder roll. The time between tics is a strong function of the transport velocity, however averaging over many encoder roll revolutions allows a correction to be calculated accurately.

U.S. Pat. No. 9,046,848 (Tomishima) uses sensors to measure the position of color images on two separate intermediate transfer belts, and adjusts the rotation speed of one belt to match the two images, rather than adjusting the image timing prior to printing.

As mentioned above, in intermediate transfer drum (ITD) systems the imaging station is at one point on the drum, while transfer is at a different point, often nearly 180° apart. If there is any runout in the ITD, this can impact image registration, since the distance along the surface of the drum from imaging to transfer is a function of the runout. For large rolls, the error in lead edge position can be much greater than the registration specification.

There are a large number of patents for improving image registration in an intermediate transfer system. However, while the systems and methods disclosed in the aforementioned publications may be generally suitable for their intended purposes, these systems and methods do not include maintaining lead edge registration in the presence of typical runout and blanket circumference tolerances in the Digital Architecture Lithographic Ink (DALI) process, resulting in lead edge registration that is not within acceptable tolerance. Thus, there remains a need for maintaining lead edge registration in an intermediate transfer system and without the need to conduct any curve fitting.

INCORPORATION BY REFERENCE

U.S. Pat. No. 10,717,305, by Donaldson, issued Jul. 21, 2020 and entitled "METHOD APPARATUS, DEVICE AND SYSTEM FOR CORRECTION OF ENCODER RUNOUT";

U.S. Pat. No. 10,635,954, by Donaldson, et al., issued Apr. 28, 2020 and entitled "DOT CLOCK SIGNAL GENERATION FOR OPERATING EJECTORS IN MULTIPLE COLOR STATIONS IN A SUBSTRATE PRINTER";

U.S. Pat. No. 9,844,961, by Mantell et al., issued Dec. 19, 2017 and entitled "SYSTEM AND METHOD FOR ANALYSIS OF LOW-CONTRAST INK TEST PATTERNS IN INKJET PRINTERS";

U.S. Pat. No. 9,409,389, by Donaldson, et al., issued Aug. 9, 2016 and entitled "COORDINATION OF PRINTHEAD/SUBSTRATE POSITION WITH TRANSFER OF MARKING MATERIAL";

U.S. Pat. No. 9,278,531, by LeFevre et al., issued Mar. 8, 2016 and entitled "PRINT HEAD PROTECTION DEVICE FOR INKJET PRINTERS";

U.S. Pat. No. 9,022,500, by Leighton et al., issued May 5, 2015 and entitled "SYSTEM AND METHOD FOR ADJUSTING THE REGISTRATION OF AN IMAGE APPLIED TO RECORDING MEDIA IN A PRINTING SYSTEM";

U.S. Pat. No. 8,967,789, by Mandel et al., issued Mar. 3, 2015 and entitled "SPREADER/TRANSFIX SYSTEM FOR HANDLING TABBED MEDIA SHEETS DURING DUPLEX PRINTING IN AN INKJET PRINTER";

U.S. Pat. No. 8,888,225, by Donaldson et al., issued Nov. 18, 2014 and entitled "METHOD FOR CALIBRATING OPTICAL DETECTOR OPERATION WITH MARKS FORMED ON A MOVING IMAGE RECEIVING SURFACE IN A PRINTER";

U.S. Pat. No. 8,870,331, by Mo et al., issued Oct. 28, 2014 and entitled "SYSTEM AND METHOD FOR PROCESS DIRECTION ALIGNMENT OF FIRST AND SECOND SIDE PRINTED IMAGES";

U.S. Pat. No. 8,833,927, by Leighton et al., issued Sep. 16, 2014 and entitled "PRINTER HAVING SKEWED TRANSFIX ROLLER TO REDUCE TORQUE DISTURBANCES";

U.S. Pat. No. 8,814,300, by Shin et al., issued Aug. 26, 2014 and entitled "SYSTEM AND METHOD FOR SUB-PIXEL INK DROP ADJUSTMENT FOR PROCESS DIRECTION REGISTRATION";

U.S. Pat. No. 8,567,894, by Viturro et al., issued Oct. 29, 2013 and entitled "REFLEX PRINTING WITH TEMPERATURE FEEDBACK CONTROL";

U.S. Pat. No. 8,491,081, by Leighton et al., issued Jul. 23, 2013 and entitled "SYSTEM AND METHOD FOR COMPENSATING FOR ROLL ECCENTRICITY IN A PRINTER";

U.S. Pat. No. 8,346,503, by Eun et al., issued Jan. 1, 2013 and entitled "SYSTEM AND METHOD FOR EQUALIZING MULTIPLE MOVING WEB VELOCITY MEASUREMENTS IN A DOUBLE REFLEX PRINTING REGISTRATION SYSTEM";

U.S. Pat. No. 8,328,315, by Eun et al., issued Dec. 11, 2012 and entitled "SYSTEM AND METHOD FOR SWITCHING REGISTRATION CONTROL MODES IN A CONTINUOUS FEED PRINTER";

U.S. Pat. No. 8,303,071, by Eun, issued Nov. 6, 2012 and entitled "SYSTEM AND METHOD FOR CONTROLLING REGISTRATION IN A CONTINUOUS FEED TANDEM PRINTER";

U.S. Pat. No. 8,251,504, by Viturro et al., issued Aug. 28, 2012 and entitled "REFLEX PRINTING WITH TEMPERATURE FEEDBACK CONTROL"; and U.S. Pat. No. 8,162,428, by Eun et al., issued Apr. 24, 2012 and entitled "SYSTEM AND METHOD FOR COMPENSATING RUNOUT ERRORS IN A MOVING WEB PRINTING SYSTEM", are all incorporated herein by reference in their entireties.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by an intermediate transfer drum (ITD) printing apparatus for registering and printing an image on top of another image already printed on a substrate and wherein the ITD includes a print roll and a transfer roll interfaced to form a transfer nip for applying the image to the substrate, the print roll having a radius, from an axis of rotation to a surface on the print roll, that is variable (e.g., a blanket with variable thickness) which introduces a device offset of the print roll. The apparatus comprises: a print head positioned over the print roll; a processor operatively connected to the print head, wherein the print head transfers the image, when commanded by the processor, to the print roll at an imaging point; a substrate transport (e.g., a self-supporting continuous media, a transport belt, etc.) operatively connected to the processor, the substrate transport driven in a process direction towards the transfer nip; a first sensor for detecting a registration mark present on the image already printed on the substrate to alert the processor of the approach of the substrate towards the ITD; a second sensor, operatively connected to the processor, for detecting a plurality of discrete angular positions that correspond to rotation of the print roll and wherein the processor uses the plurality of discrete angular positions and predetermined data of the print roll to continuously update the device offset of the print roll; a third sensor operatively connected to the processor which measures a distance traveled by the substrate between the first sensor and the print roll; and wherein when the first sensor alerts the processor of the detection of the registration mark, the processor begins counting down the most current device offset until the device offset is completed at which time the processor commands the print head to transfer the image to the print roll at the imaging point such that the image is subsequently transferred, at the transfer nip, to the substrate upon the another image in a registered position.

The foregoing and/or other aspects and utilities embodied in the present disclosure may also be achieved by providing a method for controlling an intermediate transfer drum (ITD) printing apparatus to register and print an image on top of another image already printed on a substrate and wherein the ITD includes a print roll and a transfer roll interfaced to form a transfer nip for applying the image to the substrate; the print roll having a variable radius (e.g., a blanket with variable thickness) which introduces a device offset of the print roll; the method comprises: positioning a print head over the print roll; operatively connecting a processor to the print head such that, when commanded by the processor, the print head transfers the image to the print roll at an imaging point; operatively connecting a substrate transport (e.g., a self-supporting continuous media, a transport belt, etc.) to the processor and wherein the substrate transport is driven in a process direction towards the transfer nip; detecting, using a first sensor, a registration mark present on the image already printed on the substrate to alert the processor of the approach of the substrate towards the ITD; operatively connecting a second sensor to the processor for detecting a plurality of discrete angular positions that correspond to rotation of the print roll and wherein the processor uses the plurality of discrete angular positions and predetermined data of the print roll to continuously update the device offset of the print roll; and alerting the processor, by the first sensor, of the detection of the registration mark; and counting down the most current device offset, by the processor, until the device offset is completed at which time the processor commands the print head to transfer the image to the print roll at the imaging point such that the image is subsequently transferred, at the transfer nip, to the substrate upon the another image in a registered position.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1A:
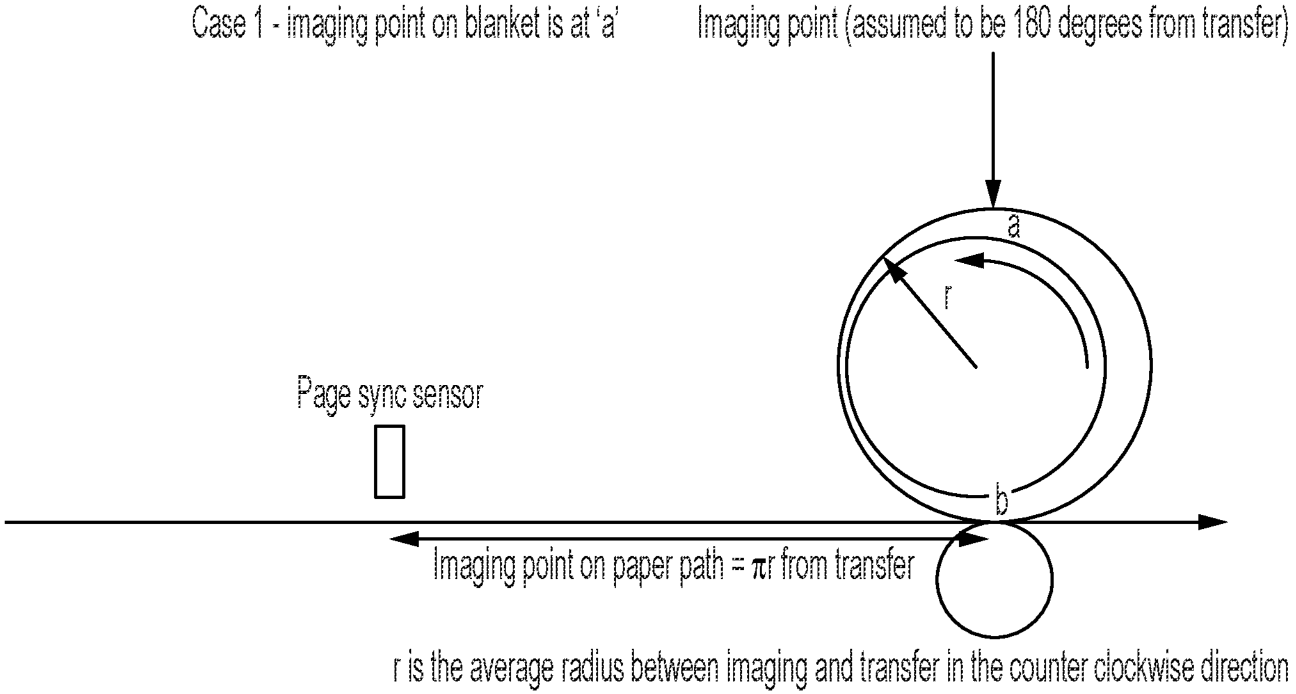
Fig. 1A Prior Art
FIGS. 1A and 1B depict the problem being addressed in the present application, for example, blanket thickness variation in an imaging roller of an intermediate transfer system causing misregistration of images on a substrate.
Figure 1B:
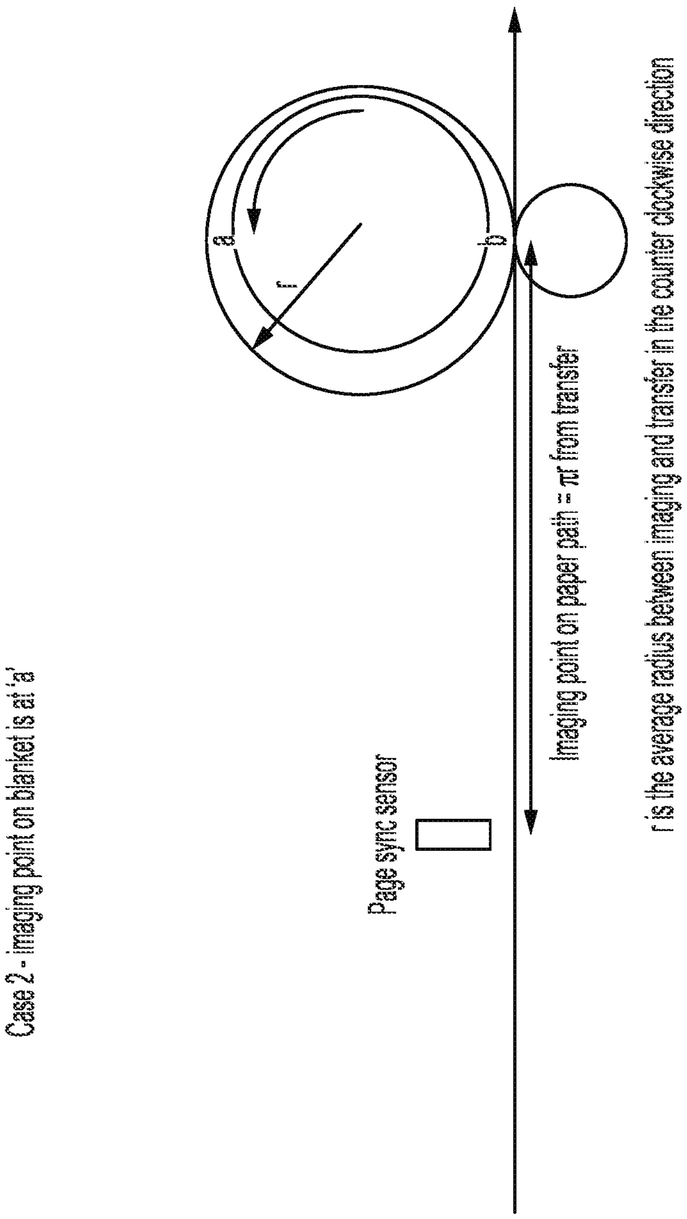
Fig. 1B Prior Art

Various methods, apparatuses, devices and systems herein load a "device offset" into a distance register of a controller. In general, the device offset comprises the total distance that the substrate with an image thereon must travel before another image is properly printed on top thereof via a print roll. In particular, this device offset comprises a nominal offset to which is added correction data, the latter of which is typically predetermined for the particular print roll and is organized in a software look-up table (LUT). It should be noted that two measurements are taken: one for distance, one for print roll angle. The angular position of the print roll needs to be measured by a sensor on the print roll. Distance measurement can be done by a sensor on any roll moving at the speed of the substrate. For example, a sensor (e.g., an angular encoder) detects the current angular position of the print roll and allows the controller to continuously update the device offset stored in the distance register in view of the LUT. When a page sync sensor detects a registration mark of an image on the substrate, the page sync sensor alerts the controller which looks at the current value of the device offset in the distance register and then begins "counting down" the device offset as described next. It should be understood that the invention is directed to correcting for device offset for whatever reason(s) that the radius of the print roll is variable, from an axis of rotation to the surface. The prior example of a print roll having a variable radius (e.g., FIGS. 1A-1B), depicts a blanket of variable thickness; but that is just one example of a print roll having a "variable radius."

The disclosed methods, apparatuses, devices and systems count down the device offset in discrete distance increments based on relative movement of the substrate and the printhead (e.g., based on "tics" counted by a physical item rotating or moving within the print roll or associated roller). When the distance counter reaches the last discrete distance increment of the device offset, these methods, apparatuses, devices and systems load the fractional remaining distance of the device into a time counter of the printing device. The fractional remaining distance is a distance less than one of the discrete distance increments corrected for encoder runout and counted by the distance counter.

Then, the fractional remaining distance is measured using velocity-based calculated distance increments at regular time intervals using the time counter. The regular time intervals corresponding to time signals received from a time clock of the printing device. The distance value of each velocity-based distance increment is calculated, based on the current relative velocity between the printhead and the substrate (and the time signal rate output by the time clock); or a nominal (previously calculated) velocity-based distance increment can be used. When the time counter reaches the last velocity-based distance increment of the fractional remaining distance, the image is transferred from the print head to the print roll. The print roll rotates through the angle between imaging and transfer, and the printed image is transferred on top of the image already present on the substrate.

Printing apparatuses and devices herein include, among other components, any form of printhead, a processor operatively (meaning directly or indirectly) connected to the printhead, a substrate support operatively connected to the processor, etc. The substrate support can include rollers, a plate or platform, etc., that supports a substrate adjacent to the printhead. The printhead transfers (e.g., ejects, releases, disperses, forces, directs etc.) material in discrete units (e.g., dots, drops, droplets, pixels, etc.) toward a print roll, which then transfers the image to the substrate after rotating through a fixed angle.

Further, such printing apparatuses and devices include an angular sensor (to measure print roll angular position); a distance sensor (to measure substrate distance travelled) also operatively connected to the processor; and a time clock operatively connected to the time counter. The angular and distance sensors may be a single encoder mounted to the print roll measuring both angle and distance, or an angular sensor on the print roll, with an encoder mounted on a roll with a smaller diameter measuring distance with higher resolution. The encoder counts in discrete distance increments as the substrate moves relative to the printhead, and the time counter counts using velocity-based calculated distance increments at regular time intervals. The regular time intervals correspond to time signals received by the time counter from the time clock.

The processor loads a device offset into the distance counter. The distance counter counts the device offset in the discrete distance increments, based on relative movement of the substrate.

The processor loads the distance of the device offset into the time counter when the distance counter reaches the last discrete distance increment of the firing distance. The fractional remaining distance is less than one of the discrete distance increments. The time counter counts the fractional remaining distance in the velocity-based distance increments at the regular time intervals. The processor can determine the velocity-based calculated distance increments based on the current relative velocity between the printhead and the substrate. Then, the printhead transfers the image to the print roll when the time counter reaches the last velocity-based calculated distance increment of the fractional remaining distance.

These and other features are described in, or are apparent from, the following detailed description.

In some cases (such as with a drive-roll mounted encoder) the distance the substrate travels between encoder tics may not be the same at all encoder positions. This is particularly true for rotary encoders, where the encoder may not be mounted perfectly centered on a drive roll. In these cases, the distance the substrate moves between encoder tics may depend on the position of the encoder relative to some index location. The encoder will send out an index pulse when the encoder is at one absolute location (for a linear encoder) or angle of rotation (for a rotary encoder). The encoder position can be determined by counting tics past the index.

In order to accommodate this, with devices and methods herein, the distance increment is a function of the encoder position. For a rotary encoder according to an exemplary embodiment of this disclosure, a pair of sin and cos functions are generated during a power-up cycle at the printer or some other time and used to approximate the distance traveled per tic at different points on the roll. The sin and cos functions are based on logged encoder runout distance data which measures a clock count between tics. The sin and cos functions are subsequently used to generate a tic distance table indicating the distance between specific tics. The devices and methods herein apply the correction or apply the provided encoder runout tic distance data to the distance increment used by the primary counter.

As discussed above, the exemplary embodiments discussed herein generates an encoder runout angular distance correction function which is used to calculate the angular distance between tics as a function of the encoder angular position, i.e., tics post an encoder index. To generate this correction function, the measured time (for example, number of 100 MHz clock counts) between encoder tics is used to measure the encoder runout. While the time between tics is a strong function of the velocity, averaging over many encoder roll revolutions allows the correction function to be calculated accurately. This technique of determining encoder roll runout is especially useful in cut-sheet printing systems where long printed test patterns cannot be used. The disclosed correction can be achieved by simply running the encoder and counting the tics. According to an exemplary embodiment, Absolute Registration Code operatively associated with a control processor maintains a distance to the next dot clock which is decremented by the encoder tic distance each time a tic is detected. The index-corrected distance per tic is used in place of the nominal distance per tic. U.S. Pat. No. 9,409,389, by Donaldson et al., issued Aug. 9, 2016 and entitled "Coordination of printheads/substrate position with transfer of marking material" provides additional details of the Absolute Registration Code described herein.

The yRegistration (transport/process direction) FPGA (Field-Programmable Gate Array) code counts the number of yReg clocks between encoder marks. This information is transmitted to the yReg code at each interrupt, along with the total number of encoder counts. The encoder index position is also recorded, so that the number of counts past the index can be determined.

The disclosed encoder runout correction process averages the clock counts per tic for some interval of time past the index. As a result, over many encoder revolutions obtained is a direct measure of the relative distance between tics around the encoder roll. According to an exemplary embodiment, the time between tics is separated out into sin and cos terms (or a magnitude+phase). The sin/cos terms are used to generate a table of tic distance vs encoder position, and the corrected distance per tic is downloaded to the FPGA at each interrupt, and used in the Absolute yRegistration algorithm. While the described implementation includes the use of sin and cos functions to fit averaged data, other exemplary embodiments include the use of the measured values directly, or other smoothing functions, such as a cubic interpolation to estimate the distance traveled for each encoder tic.

Figure 2A:
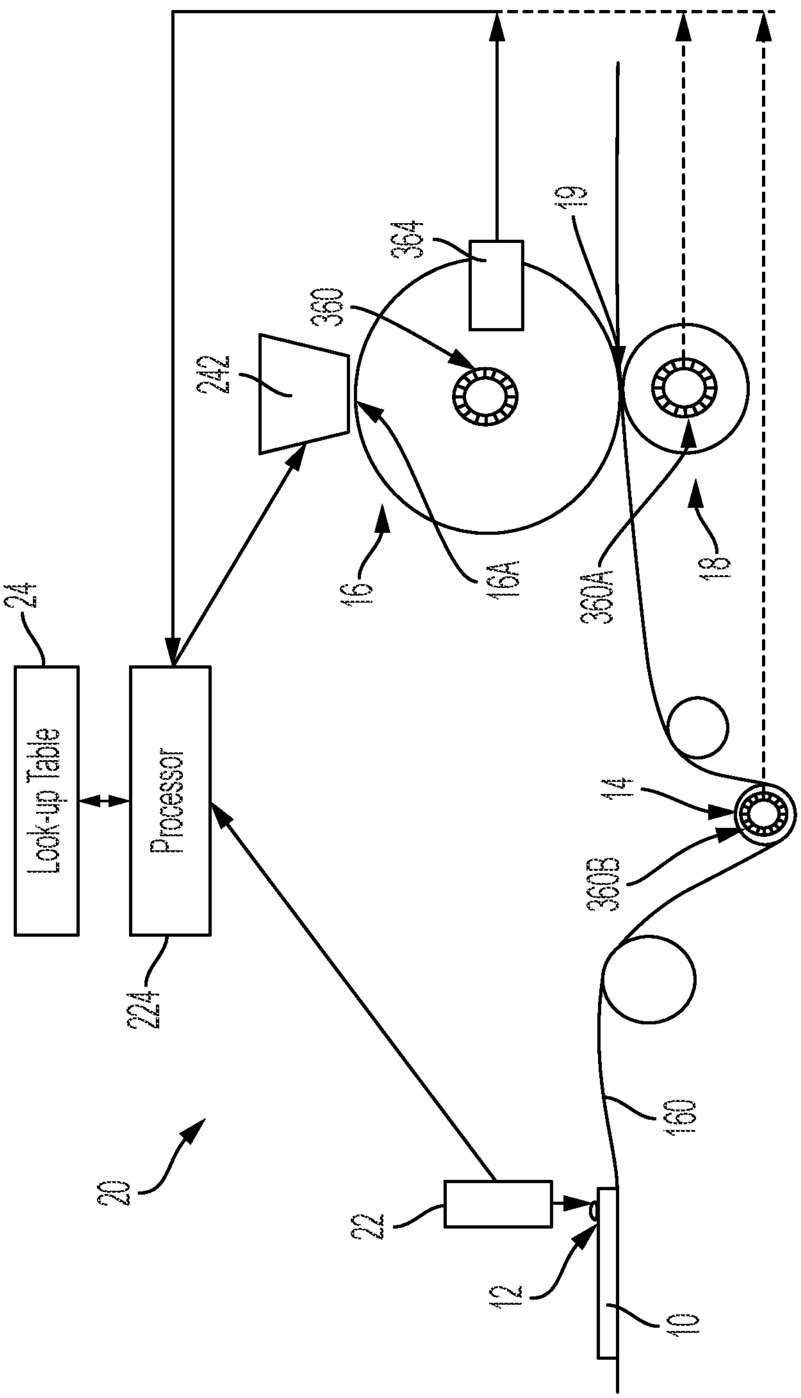
FIG. 2A is block diagram of the system of present invention to correct for device offset in aligning one image on top of an existing image on a print substrate.
Figure 2B:
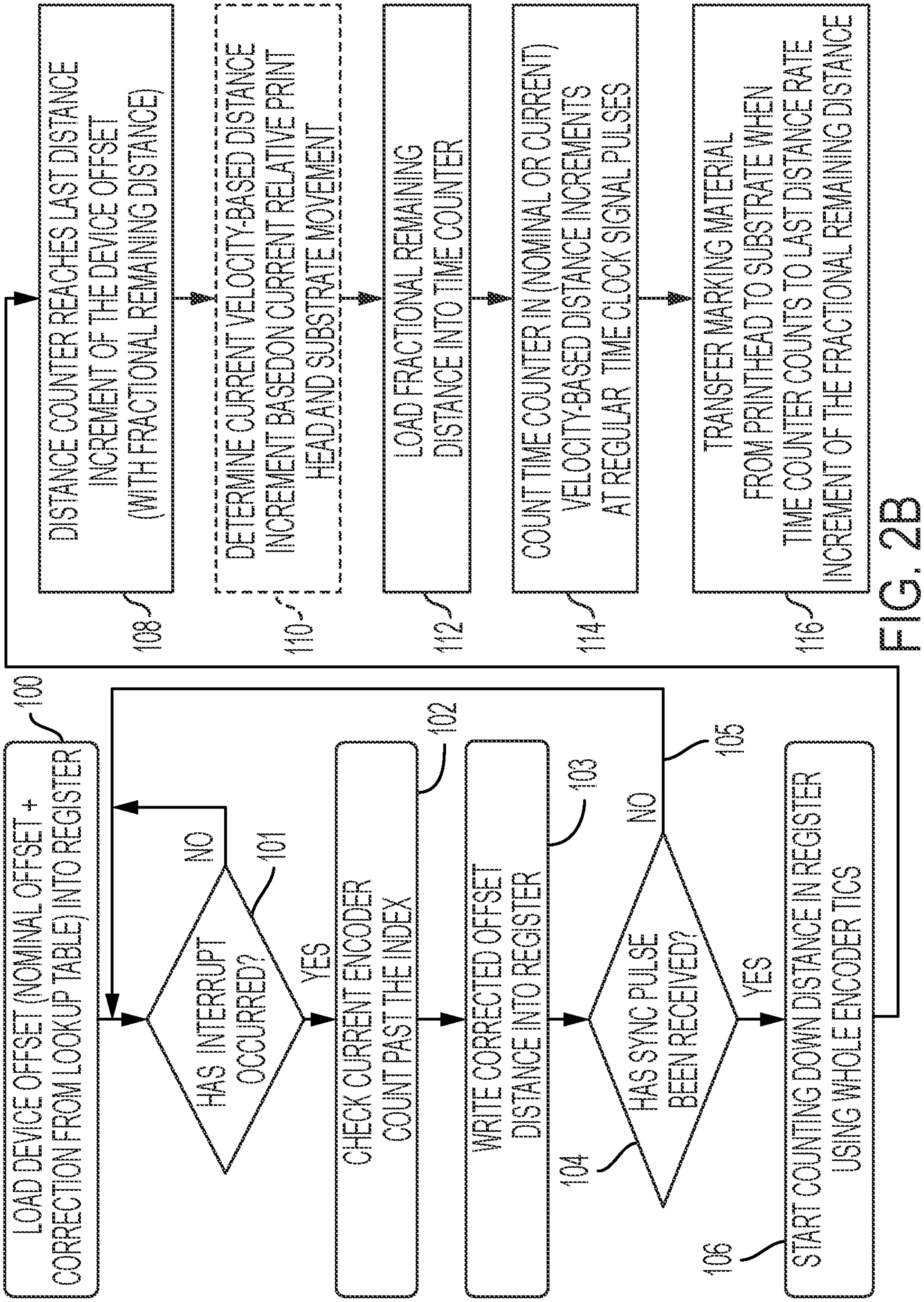
FIG. 2B is a flowchart illustrating an exemplary method herein that performs automated operations to correct for device offset in aligning one image on top of an existing image on a print substrate.
Figure 3:
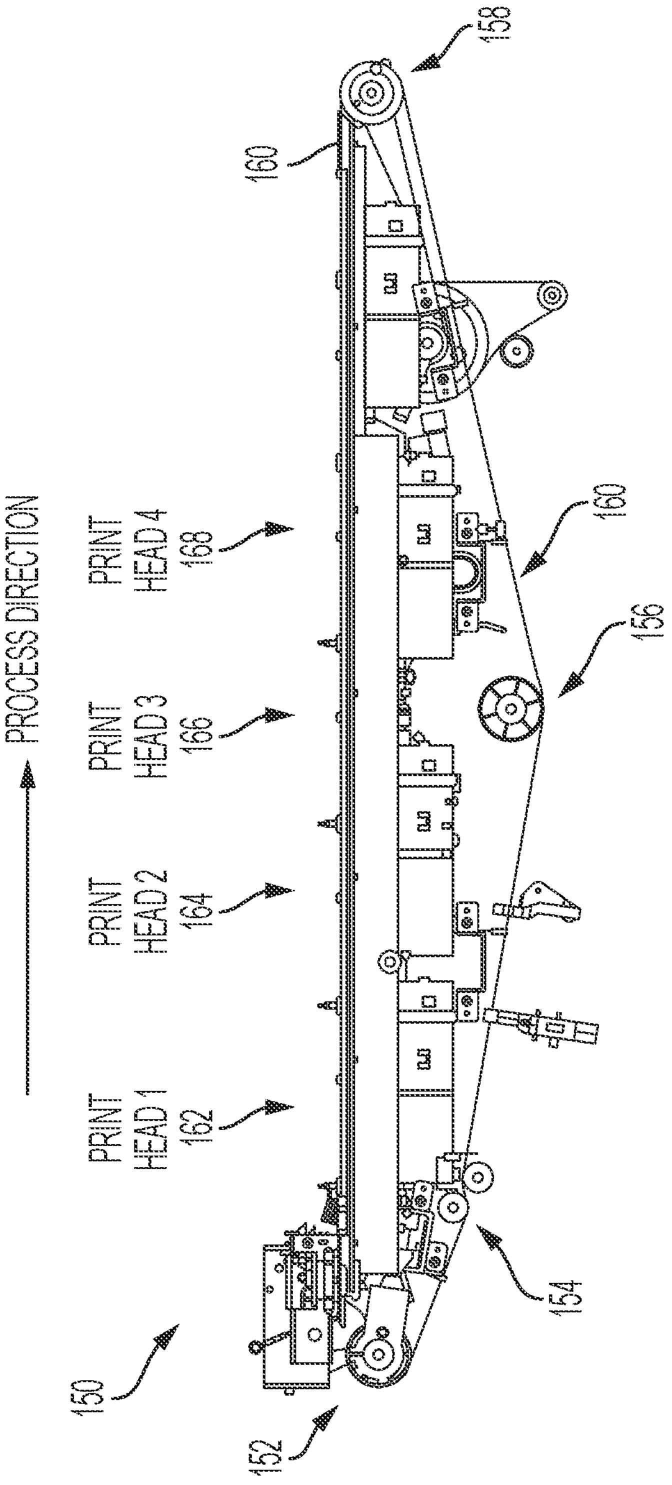
FIG. 3 depicts a diagram of a media transport including an encoder/encoder roller arrangement.

FIG. 2A is block diagram of the invention 20 of the present application and represents one print station of the several print stations of a media transport depicted in FIG. 3. Thus, as each print station transfers an image to the substrate, it is important to ensure that the next print station deposits its respective image on top of the prior print stage's deposited image in proper registration on the substrate. FIG. 2B is a flow chart of the method of the invention 20 of the present application which does not require user input.

Figure 8:
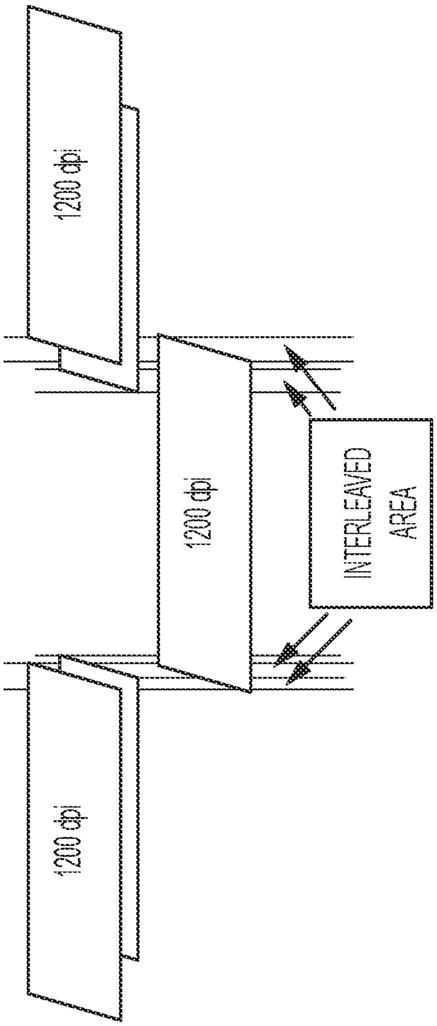
FIG. 8 is a diagram of a marking station including interleaved printheads according to an exemplary embodiment of the present invention.

Before FIG. 2A/2B are discussed, the overall media transport 150 is discussed. FIG. 3 is a diagram of a media transport 150 including an encoder/encoder roller arrangement, the media transport 150 including a media cut-sheet transport belt 160, a steering mechanism 152, a reflex roller 154, a belt tensioner roller 156, and a transport belt drive roller 158 and print rolls 162, 164, 166 and 168. An encoder/encoder roller arrangement, for example as shown in FIG. 8, is incorporated into the reflex roll 154 or drive roll 158 locations of the media transport 150. Each print roll has a sensor triggered at a specific angle of rotation.

FIG. 2A a is block diagram of the system 20 of present invention to correct for device offset in aligning one image on top of an existing image on a print substrate. As shown, an intermediate transfer drum imaging stage is at the right comprising an imaging (or "print") roll 16 and transfer roll 18 that interface at the transfer nip point 19. Using the system 20, a print head 242 (discussed in detail below) is instructed by the processor 224 (also discussed in detail below) to transfer an image to the print roll 16 so that it is "synched" or "registered" properly with an existing image on a substrate 10. The system 20 further comprises a page sync sensor 22 that sends an alert signal to the processor 224 when the sensor 22 detects a registration mark 12 on the existing image on the substrate 10 moving on transport belt 160. The look-up table (LUT) 24 contains the nominal offset as well as all of the correction data (both of which form the "device offset") for the particular print roll 16 which is communication with the processor 224. By way of example only, the print roll 16 comprises an encoder index 360 and detector 364 which communicates with the processor 224. The encoder 360 (e.g., an optical encoder disk) is axially-mounted to the print roll and rotates with the print roll. As the optical encoder disk 360 rotates, the encoder 360 interrupts a light beam generated in the detector 364, which generates signals corresponding to the interruptions in the light beam. These signals generated in the detector 364 identify both the rotational velocity of the print roll 16 and the rotational position of the print roll 16. These signals are used by the processor 224 to identify the particular correction data to add to the nominal offset in updating the device offset in the register, as discussed with regard to FIG. 2B. The detector 364 should trigger once per print roll 16 revolution and the number of encoder tics expected for a single revolution of the print roll 16 need to be known. The triggering can occur at top dead center of the encoder disk 360.

Alternatively, and again by way of example, the encoder 360 may be applied to the transfer roll 18 (as encoder 360A), or to an upstream follower roll 14 (as encoder 360B), as shown by the hatched lines, for providing the processor 224 with the current print roll 16. If used with the follower roll 14, the follower roll 14 needs to measure the speed of the substrate (e.g., paper) as it goes into the transfer nip 19, in the span between the page sync sensor 22 and the print roll 16. This is important since, among other things, the tension on both sides of the transfer nip 19 could be different. As shown in FIG. 2A, the follower roll 14 forms a small roll, large wrap for the paper around the roll 14 which ensures that the roll 14 turns at the speed of the paper coming in. In fact, the encoder 360 could be used on any roll which is accurately measuring the distance the paper moves coming into the nip 19.

As can be appreciated from the foregoing, the print head 242 is transferring the image to the print roll 16 when the substrate 10 has travelled a fixed distance which is measured/counted by using encoder lines (tics) and the distance per tic. Thus, the processor 224, LUT 24, and encoder 360 form a "distance calculator' for calculating a distance the transport belt must travel before the image is transferred from the print head 242 to the print roll 16 at the imaging point 16A.

It should be noted that although there are many variant encoder devices that can provide the roll position information required for the present invention 20, an exemplary encoder may comprise a Heidenhain ERN 120 series incremental encoder having TTL output, 2048 counts/revolution with one reference mark per revolution.

The processor may calculate the print roll angle of rotation and index into the LUT 24 using encoder 360/detector 364 and counting encoder lines. For example, if there are lines per roll revolution, and the LUT 24 has 20 segments, then 20,000/20=1000 lines per segment. Thus, when an index pulse is observed from the detector 364, indicating that the print roll is at TDC, the first entry in the LUT 24 is used. At line 1000 (or at the first interrupt for which the encoder count is >1000) the processor switches to the 2nd entry of the LUT 24. In a typical application there might be 10-20 encoder lines per interrupt, and so the actual point at which the processor transitions from one offset to the next might be at line 1000, or line 1010. At line 2000 the processor switches to the 3rd entry, etc., up to line 19,000, which switches to the 20th and last entry in the LUT 24. The code uses the last entry of the LUT 24 until the index pulse is observed from detector 364 at TDC, which switches back to the 1st entry. Alternatively, detector 364 may directly measure points on the print roll corresponding to each LUT transition.

As to forming the LUT 24, this can be achieved as follows: A print job is conducted with a series of cross-hairs, or other registration marks which should overlap or align in the primary color and the color to be printed. The test pattern must be at least as long as the circumference of the print roll 16. The test pattern must be printed with some nominal offset (the number of microns the paper needs to travel after the alignment sensor detects a mark on the incoming paper before the first scanline of the image should be rendered). For each pair of registration marks, the number of microns by which the 2nd image is ahead of, or behind, the primary image is measured. The offset for each LUT 24 entry is the mean value for the registration error in that section of the roll 16. It is possible to separate this into a mean registration error, and a correction, and add the mean registration error to the nominal offset, however this is not required. The LUT 24 values do not need to sum to zero. As mentioned previously, what must be known is the angle of the roll 16 (or the number of encoder lines) corresponding to the first scanline of the test pattern. Software is provided that logs the encoder count and the number of encoder lines past the index vs the number of scanlines delivered at each interrupt so that it is easy to extrapolate backwards to find the encoder count/print roll angle for the first scanline.

The method of the present invention (as shown FIG. 2B) starts in step 100, with the device offset being loaded into the distance register. As mentioned previously, the device offset comprises the total distance that the substrate with an image thereon must travel before another image is properly printed on top thereof via a print roll; and in particular, comprises a nominal offset to which is added correction data, the latter of which is typically predetermined for the particular print roll and is organized in a software look-up table (LUT 24); or the correction data can be calculated in real time. In step 101, the method looks to see if an interrupt has occurred (e.g., 0.4 msec in the current implementation) which causes the device offset to be updated (e.g., primary encoder) of a printing device. If an interrupt has occurred, then at step 102, the processor 224 checks the current encoder count past an index, finds the corresponding correction in the LUT 24, sums that with the nominal offset and in step 103 writes the updated device offset in the Register. In step 104, the method checks to see if a sync pulse has been received from the page sync sensor, indicating that the substrate with an existing image thereon has arrived from the previous print station and the subsequent print station must "synchronize" or "register" properly to ensure that the next image is properly deposited over the existing image. If the sync pulse has arrived, then the method moves to step 106 where the device offset currently in the Register is now "counted down" using whole encoder tics. If, on the other hand, no sync pulse has arrived (step 105), then the method continues to update the device offset, going back to step 101.

Unless the device offset in the Register is completely divisible by the discrete distance increment, corrected for encoder runout, there will be a fractional remaining distance of the device offset in the distance counter after the distance counter counts to the last discrete distance increment in step 108. This fractional remaining distance is a distance less than the discrete encoder corrected distance increments counted by the distance counter. For example, if the device offset is 10.25 distance units, and the error corrected total distance associated with the next 10 tics is 10.1 distance units, the distance counter will count down 10 discrete distance increments, leaving 0.15 distance units as the fractional remaining distance. At that point, the processor 224 uses the distance per board clock cycle (microns/100 MHz clock cycle) to count down the remaining distance. The distance per clock cycle may be based upon the nominal or measured velocity.

In step 110, optionally (shown using dashed lines) the distance is calculated using a velocity-based distance increment calculation, based on the current relative velocity between the printhead and the substrate (and the time signal rate output by the time clock). In other words, the count within the primary encoder will occur at a rate over time based upon how fast the printhead and substrate are moving relative to one another, and step 110 determines the relative velocity based upon that rate corrected for the encoder runout as a function of the encoder angular position.

In step 110, the velocity of the printhead/substrate is divided by the rate of time signals produced by the time clock to arrive at the velocity-based calculated distance increment at which a time counter (e.g., secondary encoder) of the printing device will increment. Alternatively, step 110 can be skipped, and a nominal (previously calculated) velocity-based distance increment can be used which may or may not be calculated based on the encoder runout distance data. In either case, so long as the velocity of the printhead/substrate remains somewhat constant, during each clock pulse from the time clock used by the time counter, the distance between the printhead and the marking location will change by the same distance (e.g., the velocity-based distance) and each increment by the time counter represents this distance.

In step 112, the fractional remaining distance of the device offset is loaded into the time counter (e.g., secondary encoder) of the printing device. Then, in step 114, the fractional remaining distance is counted using the velocity-based calculated distance increments which may or may not be error corrected for encoder runout, at regular time intervals, using the time counter. Again, the regular time intervals correspond to periodic, regular time signals received from a time clock of the printing device. As shown in step 116, when the time counter reaches the last velocity-based calculated distance increment of the fractional remaining distance (e.g., zero or the last positive number that is smaller than one velocity-based distance increment), the marking material is transferred from the printhead to the substrate to print the image on top of the existing image on the substrate.

For example, the firing distance in step 100 can be, in this example, 10.25 distance units of any distance measurement (dots per inch (DPI), tics, inches, millimeters, microns, etc.); and this may be limited by the resolution of the printing device, the desired dot spacing, etc. The distance counter counts in "discrete" (meaning whole number) distance increments error corrected for encoder runout, and not fractions or portions of distance increments in step 108, and in this example decrements in increments of 1 distance unit, again error corrected for encoder runout. Therefore, the fractional remaining distance (step 108) of distance units.

In other words, the printhead should disburse the drop of marking material 15/100 of the way into the 10th distance increment, to properly meet a requirement of counting to 10.25 distance increments of the primary encoder. Continuing with the same example, if the time counter begins counting down at a velocity-based calculated distance increment of 0.01 distance units from a starting count of 0.15 velocity-based distance increment to zero in step 114, after 15 velocity-based distance calculated increments, the time counter reaches the device offset increment, at which point step 116 disburses the image from the printer to the substrate.

While the foregoing examples discuss that the distance counter and time counter can decrement from a higher value to a zero value, such examples are only used for convenience of illustration, and those ordinarily skilled in the art understand that the distance counter and time counter could decrement to a non-zero value, or could increment from a lower value (such as zero) to a higher value; or could decrement or increment from any value to a different value. For example, the distant counter and time counter could decrement from a value of 50 and stop at a value of 20, and similarly, the distance counter and time counter could increment from a value of 10 to a value of 20. Regardless of the type of counting performed by the distance counter and the time counter (up or down), when these counters reach a preset value (which could be zero, or a different number) they perform the action described in the flowchart shown in FIG. 2 by causing a remainder value (which could be relative to a non-zero number where counting stops) to be loaded into a different counter, or causing a printhead to transfer marking material, etc.

Provided below are further details of methods, apparatuses, devices and systems to generate encoder runout distance data, i.e., the distance between specific tics or angular positions of an encoder roller, which is used to accurately determine a distance of travel of a substrate (such as a cut-sheet, continuous web sheet, or image transfer belt), as measured by encoder tic counts to trigger one or more printheads to make the substrate.

To calculate the encoder roll runout using a yRegistration log, and applying it using the absolute yRegistration code, the following steps are performed.

A) The yReg FPGA receives signals from an encoder, including the transitions on an A and B channel which represent "light to dark" and "dark to light" transitions of the encoder signal, plus the index location. After each YReginterrupt clock cycles, the FPGA passes the following information up to the yReg application:

The number of encoder tics detected since the marker was cycled up (encoderCountLog);

The number of indexes detected since the marker was cycled up (indexCountLog); and The number of clock cycles between the last nEncoderAvg encoder tics (clkSumPrevLog).

A sample from a log is shown below:

| interruptID | encoderCountLog | indexCountLog | clkSumPrevLog | Tics past the index |
|---|---|---|---|---|
| 35039 | 2001501 | 100 | 398824 | 19698 |
| 35040 | 2001602 | 100 | 398824 | 19799 |
| 35041 | 2001702 | 100 | 398824 | 19899 |
| 35042 | 2001803 | 101 | 398824 | 0 |
| 35043 | 2001904 | 101 | 398824 | 101 |
| 35044 | 2002005 | 101 | 396608 | 202 |
| 35045 | 2002106 | 101 | 396608 | 303 |
| 35046 | 2002207 | 101 | 396608 | 404 |
| 35047 | 2002307 | 101 | 396608 | 504 |
| 35048 | 2002408 | 101 | 396608 | 605 |
| 35049 | 2002509 | 101 | 396608 | 706 |
| 35050 | 2002609 | 101 | 396608 | 806 |
| 35051 | 2002710 | 101 | 396608 | 907 |
| 35052 | 2002810 | 101 | 396608 | 1007 |
| 35053 | 2002910 | 101 | 396608 | 1107 |
| 35054 | 2003010 | 101 | 397830 | 1207 |

B) From the logged information, the approximate number of encoder tics past the index is determined.

Figure 4:
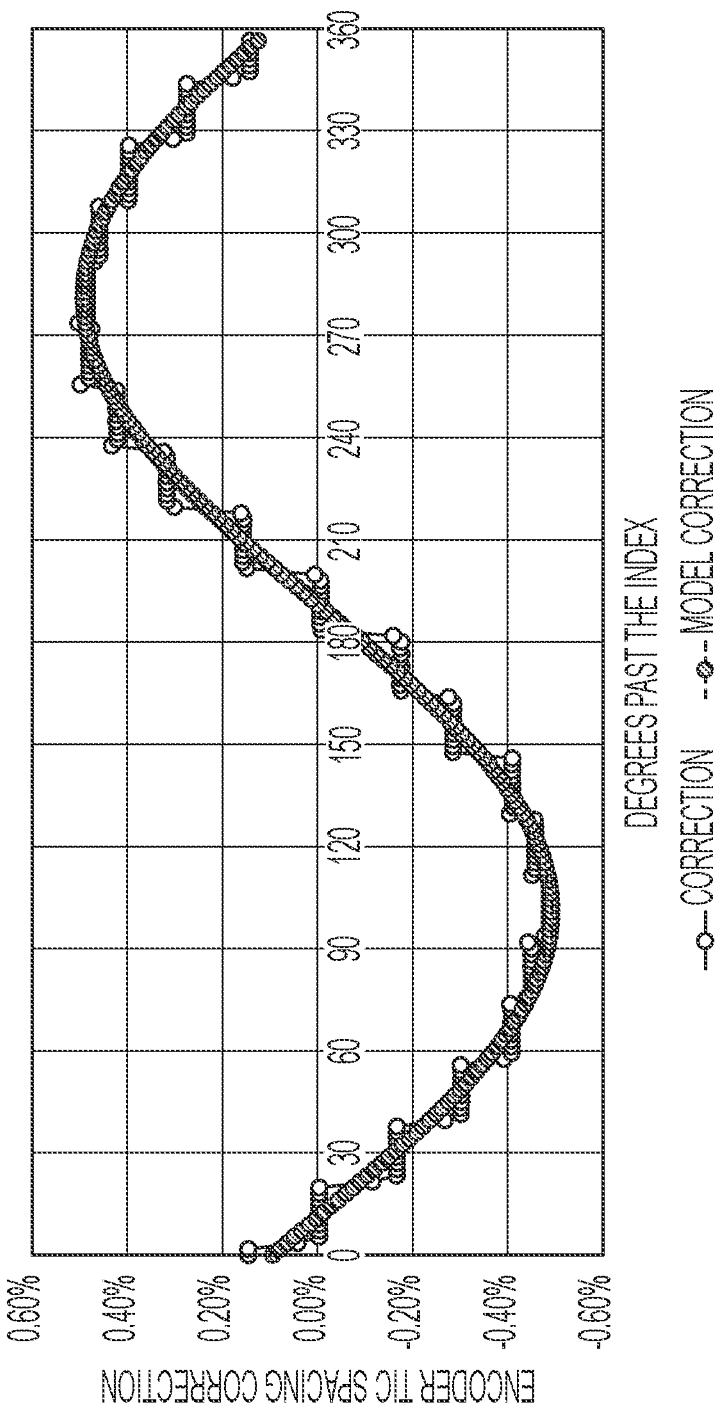
FIG. 4 is a graph of calculated runout associated with an encoder roll operatively associated with a media transport according to an exemplary embodiment of the present invention.

The graph in FIG. 4 shows the calculated runout for a drive roll and encoder arrangement averaged over 300 revolutions of the drive roll, along with the best fit sinusoid: −0.0048 sin(2*pi( )*ticsPastIndex/20000)+0.0009 cos(2*pi( )ticsPastIndex/20000. The amplitudes of the sin and cos terms were calculated during a diagnostic cycle, and saved to marker NonVolatileMemory. At cycle-up, a table is generated for the distance correction vs tics past the index. At each interrupt, the corrected value for the distance per encoder tic is downloaded to the FPGA.

Figure 5:
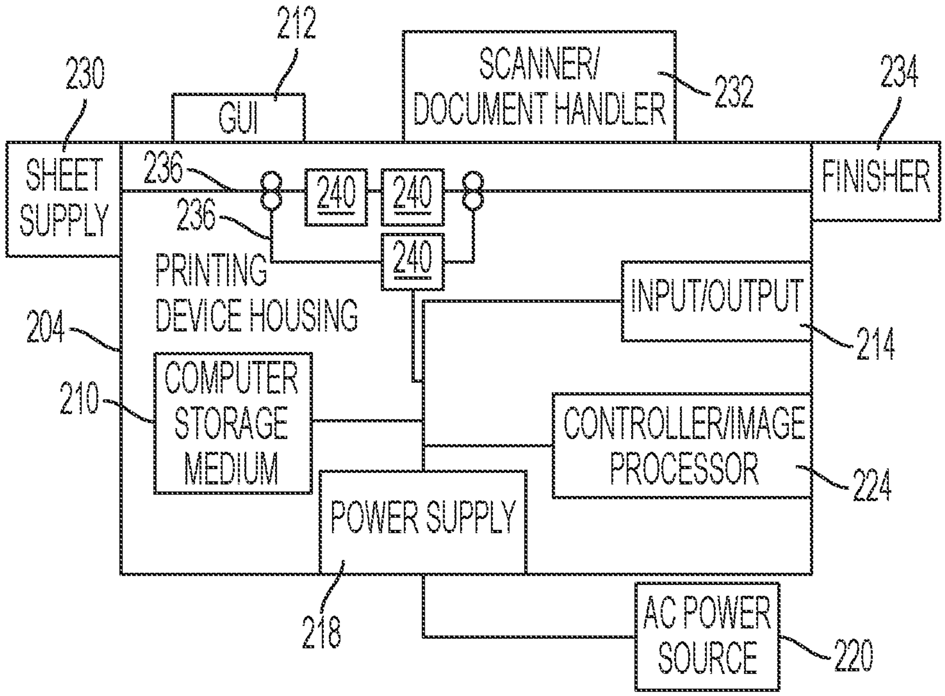
FIG. 5 is a block diagram of a printing apparatus in accordance to an exemplary embodiment of the present invention.

FIG. 5 illustrates an exemplary printing device 204, which can be used with systems and methods herein and can include, for example, a printer, copier, multi-function machine, multi-function device (MFD), etc. The printing device 204 includes a controller/tangible processor 224 and a communications port (input/output) 214 operatively connected to the tangible processor 224 and to the computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 224 controls the various actions of the computerized device. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 5, a body housing has one or more functional components that operate on power supplied from an alternating current (AC) source 220 by the power supply 218. The power supply 218 can comprise a common power conversion unit, power storage element (e.g., a battery, etc.), etc.

The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, plastics, organic material, etc.) to continuous media or sheets of media, whether currently known or developed in the future and can include, for example, devices that use a photoreceptor belt or an intermediate transfer belt, devices that print directly to print media (e.g., inkjet printers, ribbon-based contact printers, etc.), 3D printers, etc.

Figure 6:
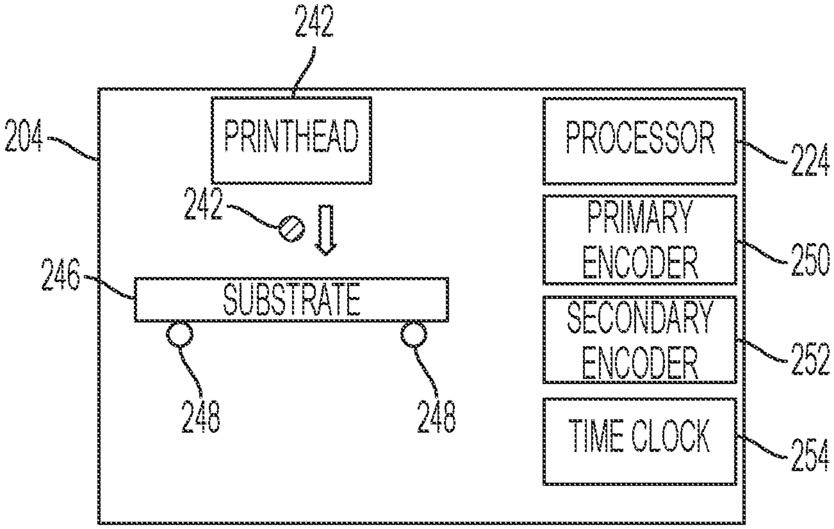
FIG. 6 is a block diagram of a media transport associated with a printing apparatus according to an exemplary embodiment of the present invention.

As additionally shown in FIG. 6, the printing apparatuses 204 herein can include, among other components, any form of printhead 242, a processor 224 operatively connected to the printhead 242, a support 248 operatively connected to the processor 224, etc. The support 248 can comprise rollers, a plate or platform, etc., that supports a substrate 246 adjacent to the printhead 242. The printhead 242 transfers material in discrete units toward, or on to, the substrate 246. Further, such printing devices include a primary encoder 250 (e.g., distance counter) and a secondary encoder 252 (e.g., a time counter) also operatively connected to the processor 224. The primary encoder 250 counts in discrete distance increments as the substrate 246 moves relative to the printhead 242. The time counter 252 counts at regular time intervals correspond to time signals received by the time counter 252 from the time clock 254.

The processor 224 loads a device offset into the distance counter 250. The distance counter 250 counts down the device offset in the discrete distance increments corrected for encoder runout as discussed herein, based on relative movement of the substrate 246 and the printhead 242.

The processor 224 loads the fractional remaining distance of the device offset into the time counter 252 when the distance counter 250 reaches the last discrete distance increment of the firing distance. The fractional remaining distance is a distance less than one of the discrete distance increments. The time counter 252 counts the fractional remaining distance in the velocity-based distance increments at the regular time intervals. The processor 224 can determine the velocity-based distance increments based on the current relative velocity between the printhead 242 and the substrate 246. The printhead 242 transfers the marking material to the substrate 246 when the time counter 252 reaches the last velocity-based distance increment of the fractional remaining distance.

Figure 7:
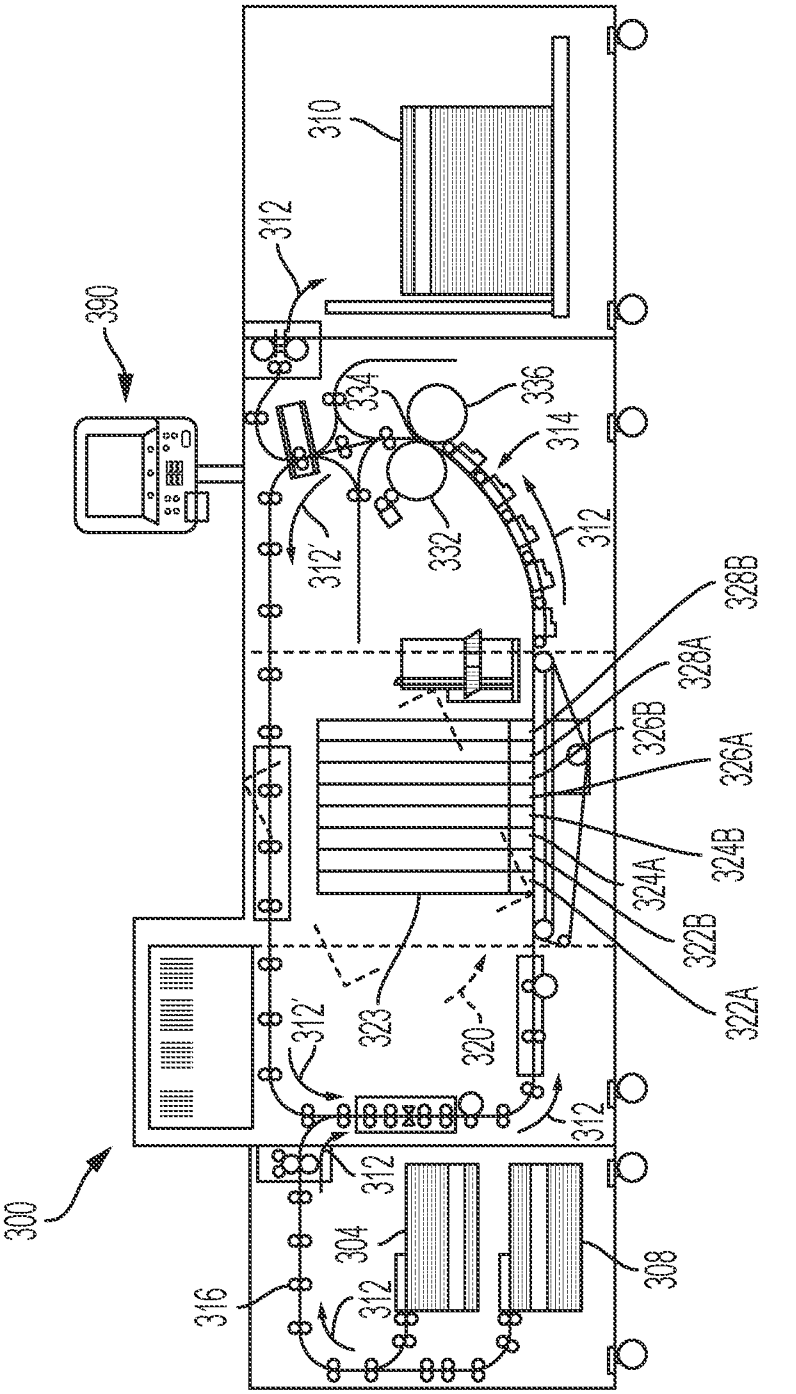
FIG. 7 is a diagram of a printing system including an encoder arrangement associated with media transport rollers according to an exemplary embodiment of the present invention.

FIG. 7 depicts an exemplary direct inkjet printer 300 that includes media supplies 304 and 308, a media path 312, a print zone 320, a media sheet conveyor 314, a spreader roller 332, a pressure roller 336, a media output tray 310, and a controller 390. The media supplies 304 and 308 are each configured to hold a plurality of media sheets and supply the media sheets to the printer via the media path 312 for printing. In the embodiment of printer 300, the media supplies 304 and 308 can hold media sheets of different sizes. In alternative configurations, either or both media supplies 304 and 308 hold media sheets having A4 size (210 mm·times·297 mm), legal size (216 mm·times·356 mm), tabloid size (279 mm·times·432 mm), letter, legal, A4, or tabloid size tabbed media sheets, or various other sheet sizes. Other embodiments can include more than two media supplies to enable the printer to store and print a variety of media sizes and types. Various printer embodiments move the media sheets in either a length or width orientation during printing. Thus, the "length" of a media sheet in the process direction can be either of the length or width dimensions commonly used to describe a media sheet size. For example, the length of a letter size media sheet in the process direction can be either 215.9 mm or 279.4 mm depending on the orientation of the media sheet as a media transport moves the media sheet in a process direction through the printer.

During a print job, media sheets from one or both of the media supplies 304 and 308 move along the media path 312. The media path 312 is a media transport that includes a plurality of guide rollers, such as guide rollers 316, which engage each media sheet and move the media sheets through the printer 300. In FIG. 7, the media path 312 guides each media sheet past a print zone 320 in a process direction for imaging operations on a first side of each media sheet. A portion of the media path 312' reverses an orientation of the media sheets and directs the media sheets through the print zone 320 a second time in the process direction to enable the print zone 320 to print ink images during imaging operations on the second side of each media sheet. As described in more detail below, a portion of the media path 312 between the print zone 320 and the rollers 332 and 336 includes a series of variable speed conveyors 314.

The print zone 320 includes a plurality of printheads arranged in a cross-process direction across a width of each media sheet. In FIG. 7, the print zone 320 includes a total of eight marking stations configured to print color images using a combination of cyan, magenta, yellow, and black (CMYK) inks. In the print zone 320, marking stations 322A and 322B print magenta ink, marking stations 324A and 324B print cyan ink, marking stations 326A and 326B print yellow ink, and marking stations 328A and 328B print black ink, Various alternative configurations print with a single color of ink, or include different ink colors including spot colors. Each of the marking stations 322A-328B includes a plurality of printheads, each one of which includes a plurality of inkjets.

The printheads in each set of marking stations 322A-322B, 324A-324B, 326A-326B and 328A-328B are arranged in interleaved and staggered arrays to enable printing over the entire cross-process width of a media sheet. For example, marking station 322A includes one array of printheads that print images at a resolution of 600-1200 drops per inch (DPI) in the cross-process direction over a media sheet. Each printhead in the array covers a portion of the width of the media sheet. Marking station 322B includes a second staggered array of printheads that are interleaved with the printheads in the marking station 322A to enable both of the marking stations to print magenta ink across the entire width of the media with a resolution of 600 DPI in the cross-process direction, as shown in FIG. 8. Each marking state includes a set of supporting electronics 323. The electronics include driver electronics, which generate the signals that operate the printheads in the marking station 322A.

A media sheet moves through the print zone 320 to receive an ink image and the media path 312 moves the media sheet out of the print zone 320 in the process direction. The printheads in marking stations 322A-328B print ink drops onto a predetermined area of the surface of the print roll as the media sheet moves through the print zone to transfer an ink image onto the media sheet. A section of the media path 312 located after the print zone 320 includes one or more conveyors 314. The conveyors 314 are configured to control the velocity of the media sheet in the process direction as the media sheet approaches a nip 334 formed between spreader roller 332 and pressure roller 336 and to shift the media sheet in the cross-process direction. As described in more detail below, the printer 300 controls the rotation of the rollers 332 and 336 and the movement of media sheets on the conveyors 314 to enable each media sheet to pass through the nip 334 with minimal re-transfer of release agent to a non-imaged side of the media sheet during duplex print operations.

Figure 9:
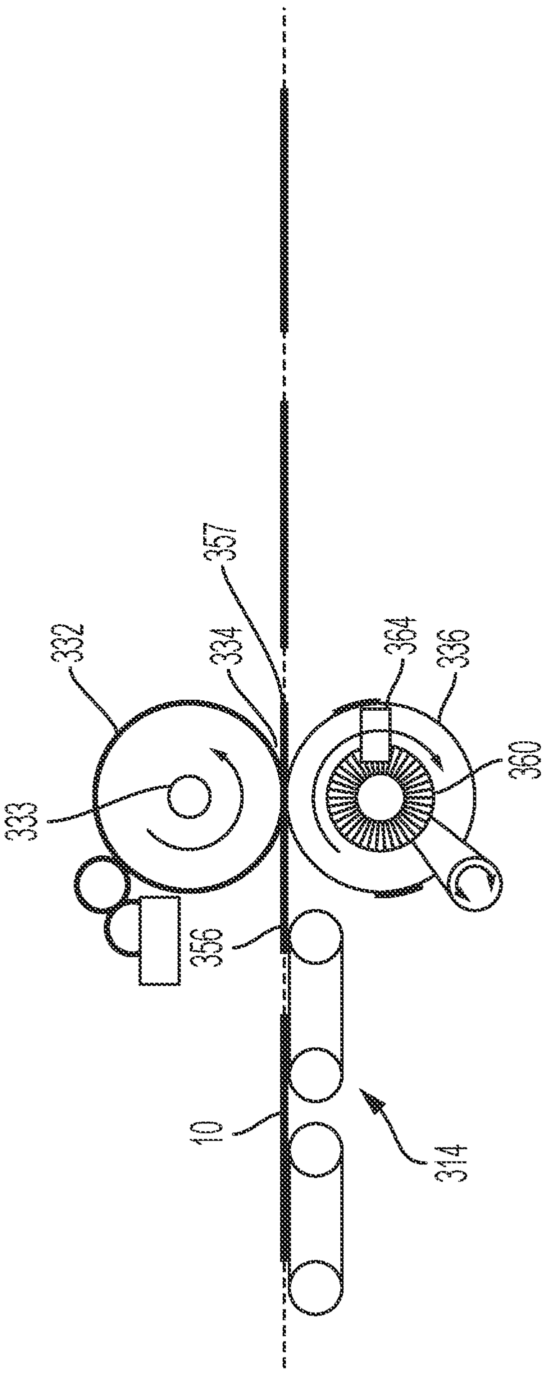
FIG. 9 is a diagram of an encoder/roller arrangement associated with a media transport according to an exemplary embodiment of the present invention.

In an intermediate transfer system the image may be fused to the media in a trans-fix step. FIG. 9 depicts an exemplary set of rollers 332 and 336 in the printer 300. Media sheets pass through the nip 334 formed between the rollers 332 and 336. In the embodiment of printer 300, both the spreader roller 332 and pressure roller 336 apply pressure to media sheets as the media sheets pass through the nip 334. The spreader roller 332 engages the side of the media sheet that carries the ink drops formed on the sheet in the print zone, and the pressure applied to the media sheet spreads and fixes the ink to the media sheet. An actuator 333 rotates the spreader roller 332 to move media sheets in the process direction, and the friction between the rollers generates a counter-rotation in the pressure roller 336. In other embodiments, a separate drive motor rotates the pressure roller 336 to position the pressure roller 336 accurately during periods when the nip is split or opened, for example, between print jobs. The side of each media sheet holding an ink image printed in the print zone 320 contacts the spreader roller 332, while pressure roller 336 contacts the opposite side of the media sheet. The rollers 332 and 336 apply pressure, and optionally heat, to the media sheet as the media sheet moves through the nip 334. The pressure and heat flatten individual ink drops formed on the media sheet so that the ink image formed on the media sheet is "fixed" to the sheet in a durable manner.

During operation, the rotational position of the pressure roller 336 is monitored by a rotational sensor including an optical encoder disk 360, according to an exemplary embodiment, and a sensor 364. The optical encoder disk is axially mounted to the pressure roller 336 and rotates with the pressure roller 336. As the optical encoder disk 360 rotates, the encoder 360 interrupts a light beam generated in the sensor 364, which generates signals corresponding to the interruptions in the light beam. The signals generated in the sensor 364 identify both the rotational velocity of the pressure roller 336 and the rotational position of the pressure roller 336. In an alternative embodiment, the optical encoder disk includes a predetermined pattern of light and dark segments that alter the reflection of light from the surface of the optical disk to the sensor 364 as the optical encoder rotates. In still another embodiment, the pressure roller 336 is configured with a Hall Effect sensor.

The printer controller is configured to operate the media transport to position a media sheet that is different than a previous media sheet at a position to enable the portions of the second side of the media sheet that are to receive ink drops in the second-side printing operation to receive minimal release agent transfer during the first-side imaging operation. The controller operates a plurality of actuators in the media transport to position the media sheet at the desired position longitudinally on the pressure or transfix roller. The actuators move the media sheet into the nip to enable the media sheet to enter the nip at a location that minimizes the potential for pixel dropout on the second side of the media sheet.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. An intermediate transfer drum (ITD) printing apparatus for registering and printing an image on top of another image already printed on a substrate and wherein the ITD includes a print roll and a transfer roll interfaced to form a transfer nip for applying the image to the substrate, and wherein the print roll has a radius, from an axis of rotation to a surface of the print roll, that is variable which introduces a device offset of the print roll, said apparatus comprising:

a print head positioned over the print roll;

a processor operatively connected to the print head, said print head transferring the image, when commanded by said processor, to the print roll at an imaging point;

a substrate transport operatively connected to the processor and driven in a process direction towards the transfer nip;

a first sensor for detecting a registration mark present on the image already printed on the substrate to alert said processor of the approach of the substrate towards the ITD;

a second sensor, operatively connected to said processor, for detecting a plurality of discrete angular positions that correspond to rotation of said print roll, said processor using said plurality of discrete angular positions and predetermined data of the print roll to continuously update the device offset of the print roll;

a third sensor, operatively, connected to said processor, which measures a distance traveled by the substrate between said first sensor and the print roll; and wherein when said first sensor alerts said processor of the detection of said registration mark, said processor begins counting down the most current device offset until the device offset is completed at which time said processor commands said print head to transfer the image to said print roll at said imaging point such that the image is subsequently transferred, at the transfer nip, to the substrate upon the another image in a registered position.

2. The ITD printing apparatus of claim 1 wherein said second and third sensors comprise an encoder disk and encoder index detector, said encoder disk coaxially-mounted on the print roll.

3. The ITD printing apparatus of claim 1 wherein said second sensor comprises an index detector on the print roll, and the third sensor comprises an encoder disk coaxially-mounted on the transfer roll and wherein rotation of the transfer roll is configured.to match the surface speed of the print roll in the transfer nip.

4. The ITD printing apparatus of claim 1 wherein said second sensor comprises an index detector on the print roll and the second sensor comprises an encoder disk coaxially-mounted on a follower roll, upstream of said ITD, and wherein rotation of the follower roll is configured to freely rotate with the substrate such that the roll surface speed matches the substrate speed.

5. The ITD printing apparatus of claim 1 wherein said processor counts down said most current device offset by using whole values of encoder tics until a fractional increment of encoder tics remains.

6. The ITD printing apparatus of claim 5 further comprising said processor uses velocity-based calculated distance increments to operate on said fractional increment of encoder tics to complete the count down and transfer the image to the imaging point on the print roll.

7. The ITD printing apparatus of claim 1 wherein said predetermined data comprises a look-up table that associates encoder lines of revolution, in correspondence with an index position, with roll segments.

8. A method for controlling an intermediate transfer drum (ITD) printing apparatus to register and print an image on top of another image already printed on a substrate and wherein the ITD includes a print roll and a transfer roll interfaced to form a transfer nip for applying the image to the substrate, the print roll having a variable radius which introduces a device offset of the print roll, said method comprising:

positioning a print head over the print roll;

operatively connecting a processor to the print head such that, when commanded by said processor, said print head transferring the image to the print roll at an imaging point;

operatively connecting a substrate transport to the processor and wherein the substrate transport is driven in a process direction towards the transfer nip;

detecting, using a first sensor, a registration mark present on the image already printed on the substrate to alert said processor of the approach of the substrate towards the ITD;

operatively connecting a second sensor to said processor for detecting a plurality of discrete angular positions that correspond to rotation of said print roll and wherein said processor uses said plurality of discrete angular positions and predetermined data of the print roll to continuously update the device offset of the print roll; and alerting said processor, by said first sensor, of the detection of said registration mark; and counting down the most current device offset, by said processor, until the device offset is completed at which time said processor commands said print head to transfer the image to said print roll at said imaging point such that the image is subsequently transferred, at the transfer nip, to the substrate upon the another image in a registered position.

9. The method of claim 8 wherein said step of operatively connecting said second sensor comprises co-axially mounting an encoder disk on the print roll.

10. The method of claim 8 wherein said step of operatively connecting said second sensor comprises coaxially-mounting said encoder disk on the transfer roll and wherein rotation of the transfer roll is configured to match a surface velocity of the print roll in the transfer nip.

11. The method of claim 8 wherein said step of operatively connecting said second sensor comprises coaxially-mounting said encoder disk on a follower roll, upstream of said ITD, and wherein rotation of the follower roll is configured to match a surface velocity of the print roll in the transfer nip.

12. The method of claim 8 wherein said step of counting down the most current device offset comprises said processor counting down said most current device offset by using whole values of encoder tics until a fractional increment of encoder tics remains.

13. The method of claim 12 wherein said step of counting the most current device offset comprises said processor using velocity-based calculated distance increments to operate on said fractional increment of encoder tics to complete the count down and transfer the image to the imaging point on the print roll.

14. The method of claim 8 wherein said predetermined data comprises a look-up table that associates encoder lines of revolution, in correspondence with an encoder index, with roll segments.

* * * * *